United States Patent [19]
Schutz

[11] Patent Number: 5,316,174
[45] Date of Patent: May 31, 1994

[54] PALLET CONTAINER

[75] Inventor: Udo Schutz, Selters, Fed. Rep. of Germany

[73] Assignee: Protechna SA, Fribourg, Switzerland

[21] Appl. No.: 125,732

[22] Filed: Sep. 24, 1993

Related U.S. Application Data

[63] Continuation-in-part of Ser. No. 851,897, Mar. 16, 1992, Pat. No. 5,253,777.

[30] Foreign Application Priority Data

Mar. 15, 1991 [DE] Fed. Rep. of Germany ....... 4108399
Nov. 11, 1991 [DE] Fed. Rep. of Germany ....... 4136963

[51] Int. Cl.$^5$ ............................................. B65D 21/02
[52] U.S. Cl. ................................... 220/571; 220/630; 220/636; 206/386
[58] Field of Search ................. 220/571, DIG. 6, 630, 220/636; 206/380, 598, 599, 508, 503

[56] References Cited

U.S. PATENT DOCUMENTS

| | | | |
|---|---|---|---|
| 4,733,790 | 3/1988 | Stein | 220/571 |
| 5,019,346 | 5/1991 | Richter et al. | 220/571 |
| 5,033,638 | 7/1991 | Cruver et al. | 220/571 |
| 5,099,873 | 3/1992 | Sanchez | 220/571 |
| 5,161,690 | 11/1992 | Foshaug | 220/571 |

FOREIGN PATENT DOCUMENTS

| | | |
|---|---|---|
| 0363668 | 4/1990 | European Pat. Off. . |
| 2947603 | 10/1981 | Fed. Rep. of Germany . |
| 3039635 | 10/1985 | Fed. Rep. of Germany . |
| 3418301 | 11/1985 | Fed. Rep. of Germany . |

Primary Examiner—Joseph Man-Fu Moy
Attorney, Agent, or Firm—Young & Thompson

[57] ABSTRACT

Pallet container for liquids, with an inner container of a synthetic resin with sealable filling and discharge openings and with an outer jacket of metal in contact with the inner container as well as with a bottom fashioned as a pallet. The pallet (9) shape-matingly receives the inner container (2) and is attachable to a jacket (6). The bottom (11) of the inner container (2) provides a drainage floor with a central shallow drainage channel (12) extending with a slight slope from a container rear wall (2c) toward a discharge nipple (13) located on the front wall (2d) of the container (2) for the connection of a drainage valve (5). A floor pan (10) below the drainage bottom (11) of the inner container (2) has reinforcing creases (16a, 16b), the bases (17) of which lie in a common horizontal plane (18—18) and form downwardly open chambers (19) in the floor pan (10). The floor pan (10) has a downwardly drawn outer supporting rim (15) forming a continuously extending, hollow supporting collar (20). A marginal strip (21) extends at an angle from the outer supporting rim (15) of the floor pan (10) and forms, with a reinforcing strut (22) attached underneath the floor pan (10), a bottom frame (23) by which the floor pan (10) is attached, together with the jacket (6), to corner feet (27) and central feet (25, 26) of a pallet frame (28).

2 Claims, 5 Drawing Sheets

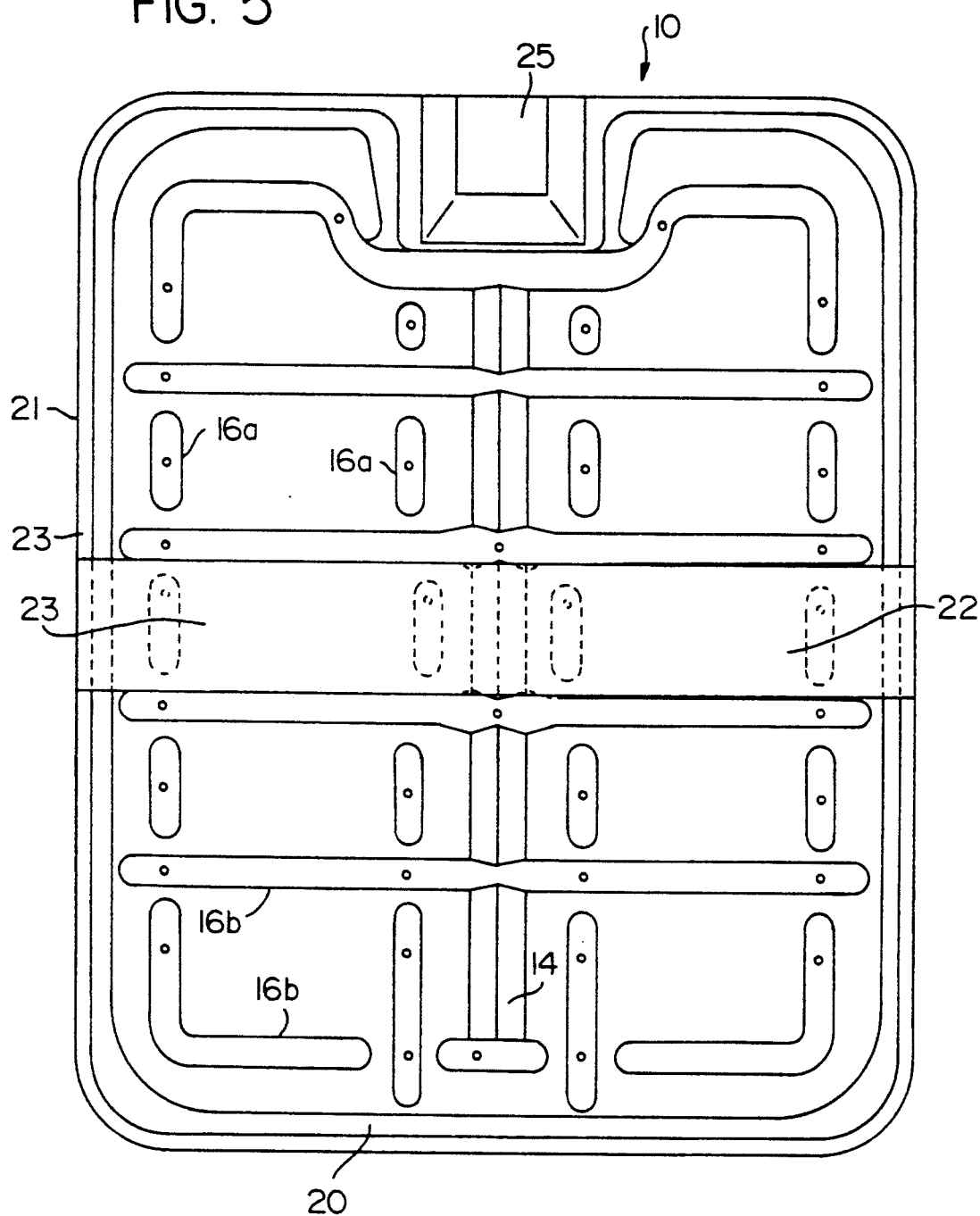

PALLET CONTAINER

This application is a continuation-in-part of my copending application Ser. No. 07/851,897 filed Mar. 16, 1992 now U.S. Pat. No. 5,253,777.

The invention relates to pallet containers for liquids with an inner container of a synthetic resin with respectively one sealable filling opening and discharge opening and with an outer jacket of metal in contact with the inner container, as well as with a bottom fashioned as a pallet wherein the pallet is adapted to being handled by means of stacker lifting trucks, shelf-servicing devices, or the like.

The pallet container of this type in accordance with EP 363,668 A1 has an outer jacket made up of horizontal and vertical lattice bars of round steel welded together at the points of intersection. The pallet, fashioned as a bottom, consists of a lattice with intersecting lattice bars forming a grating-like bottom surface and bent into feet in the downward direction at the rim of the bottom surface, these feet defining a certain distance of the bottom surface with respect to the placement surface of the pallet container. The vertical lattice bars of the outer jacket are extended into the zone of the setting-up surface and welded to the downwardly bent bars of the lattice bottom of the pallet.

For reasons of stability, the lattice bars of the lattice jacket and of the pallet formed as a lattice bottom must be dimensioned correspondingly strongly so that the pallet container according to EP 363,668 A1 has a high inherent weight which raises the shipping costs. Furthermore, this conventional pallet container is expensive from the viewpoint of manufacturing technique on account of the numerous welding spots, and the container is not designed with a view toward residual emptying. Finally, the pallet of the conventional pallet container is prone to being endangered by sound vibrations emanating from the liquid cargo during transport and by vibrations transmitted from the transporting vehicle, impairing the shipping safety.

The invention is based on the object of improving the pallet of the pallet container of this kind with respect to stability and manufacture.

The pallet container according to the invention is distinguished by the following advantages:

The modular construction makes it possible to manufacture, with a basic pallet designed as a floor pan, pallet containers having a plastic inner container and an outer jacket of sheet metal or a latticework. The modular design permits an economical, inexpensive production of various types of pallet containers. The plastic inner container and the floor pan are equipped with an inclined drainage bottom for residual emptying of the pallet container. The pallet with a floor pan open at the bottom ensures handling of the pallet container by means of stacker forklifts, shelf-servicing device, or the like that is without problems. Positioning surfaces on the projecting corner and center feet of the pallet frame, which latter engages in the stack into the lid rim or the upper end profile of the lattice jacket of a lower pallet container, ensure an accurate positioning and stacking and a simple withdrawal of the pallet containers into and, respectively, out of high-level storage shelves, with the use of shelf-servicing devices. By the use of a flat sheet-metal floor pan receiving the plastic inner container, with a lower frame exhibiting a continuous outer hollow supporting collar and downwardly open chambers, the pallet is distinguished by a good damping capacity and high rigidity in case of vibration stress as well as in case of shock or impact stress, so that the pallet container fully satisfies the high requirements with regard to safety in transport and during accidents. Due to the formation of a central foot from the sheet metal in the efflux zone during the deep drawing of the floor pan, the production of the container is simplified and made more economical, and on account of the additional cold-forming the strength of the floor pan in the efflux zone is increased. The various pallet containers, which can be equipped with a flexible inside liner of plastic sheeting or a metal-plastic composite film, are especially suited for use as multiple-trip containers that can be inexpensively reconditioned, to rid the environment of pollutants by optimum residual emptying and a pollution-free destruction of the inside liner, for example by burning, and by an easy cleaning procedure.

The invention will be described in greater detail below with reference to an embodiment. In the drawings:

FIG. 5 is a bottom view of the pallet.

Figure 1:
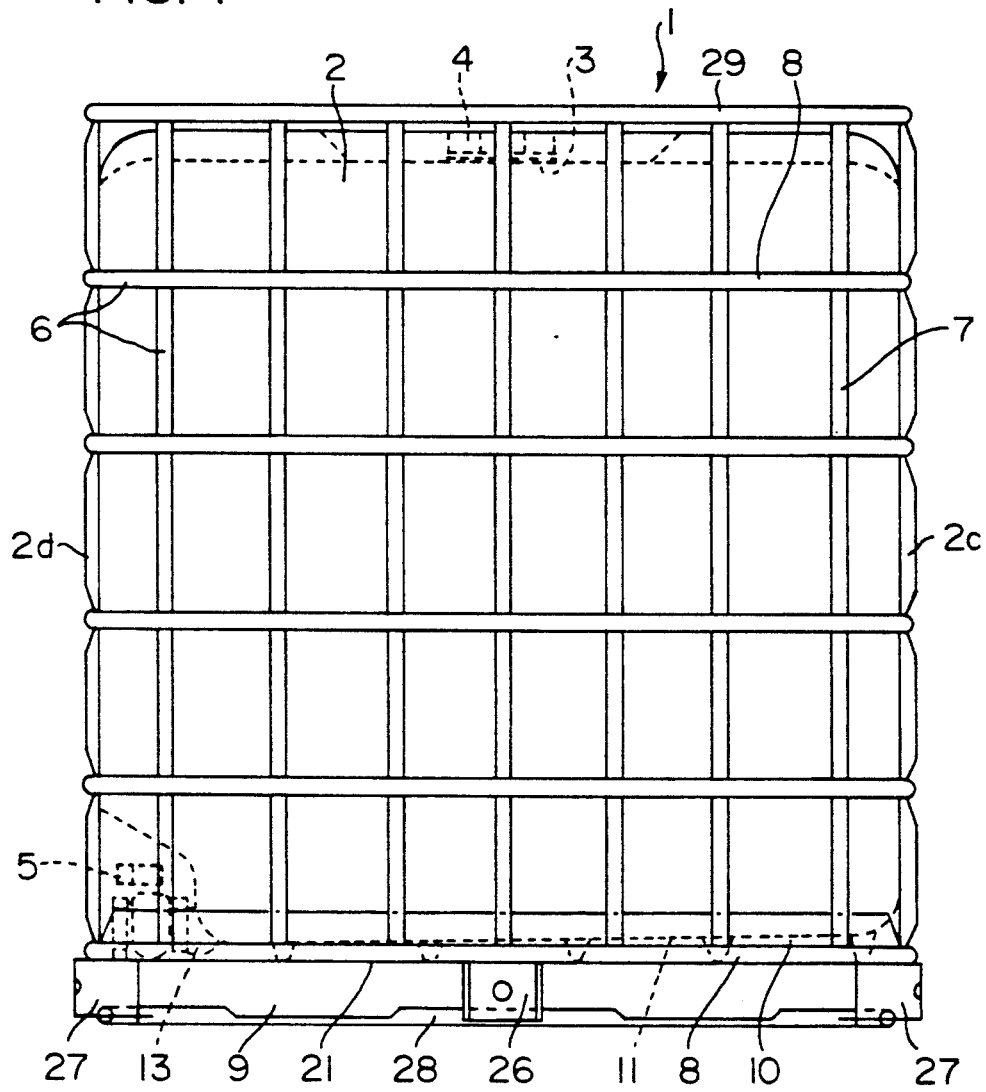
FIG. 1 is a lateral view.
Figure 2:
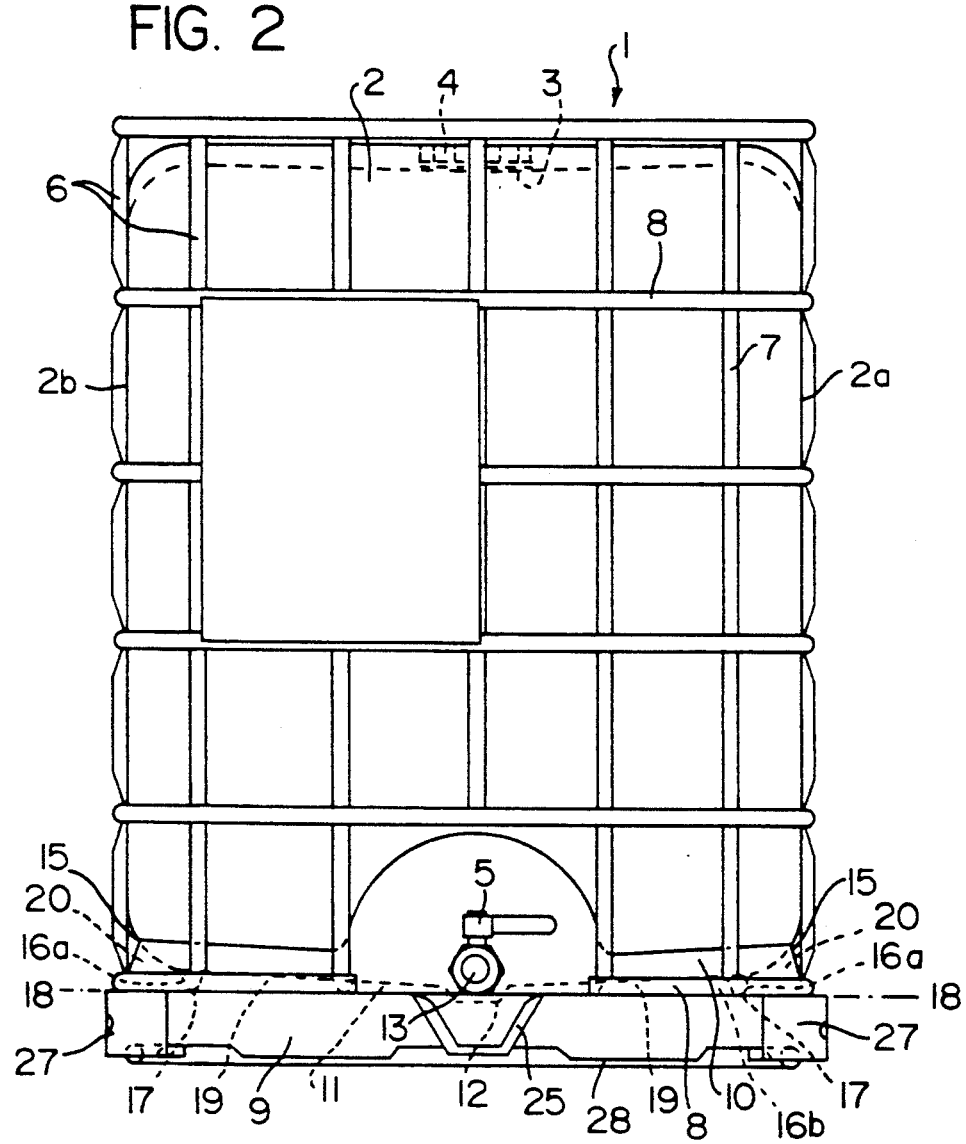
FIG. 2 is the front view of a pallet container.
Figure 3:
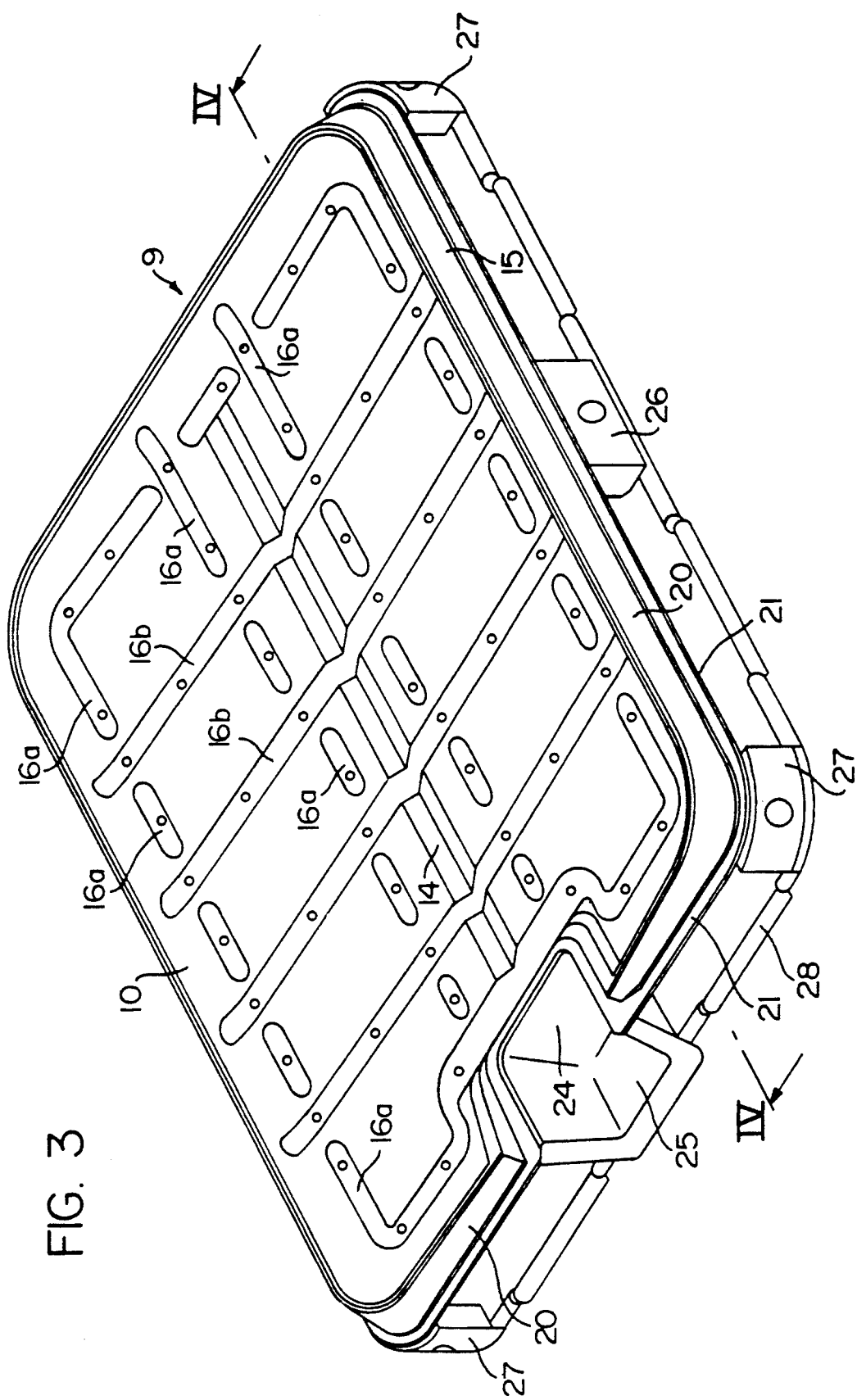
FIG. 3 is a perspective illustration of the pallet.
Figure 4:
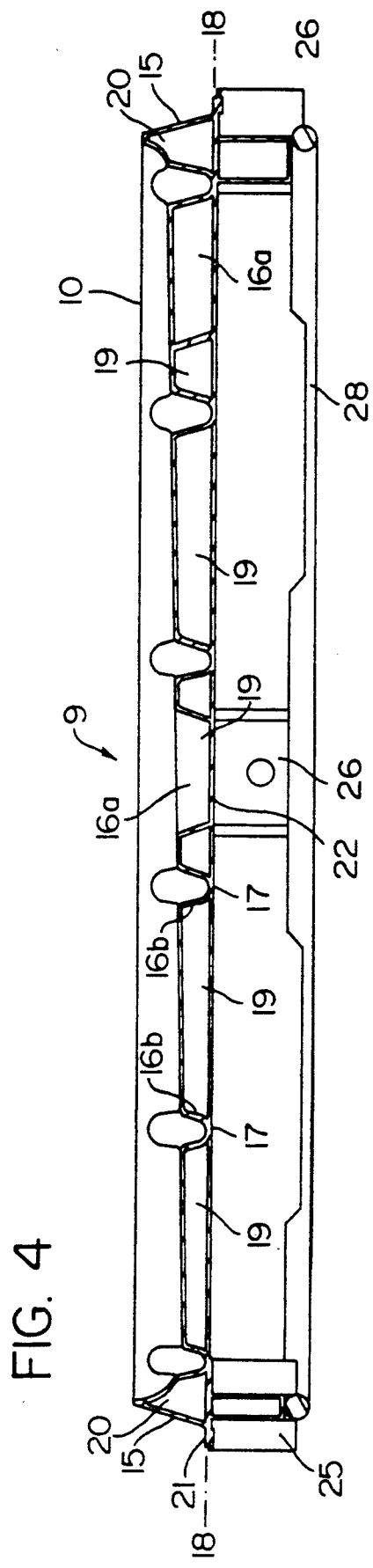
FIG. 4 is a longitudinal sectional view of the pallet along line IV—IV of FIG. 3 on an enlarged scale.

The pallet container 1 of FIGS. 1 and 2, utilized as a disposable and reusable container, for the shipping and storage of liquid cargo comprises as the main structural parts an exchangeable inner container 2 of polyethylene with a rectangular contour and rounded corners equipped with a filling nipple 3 sealable by a screw lid 4 and a drainage valve 5, an outer jacket 6 of intersecting vertical and horizontal lattice bars 7, 8 of metal, as well as a pallet 9, fashioned as a flat floor pan 10 of sheet metal, with length and width dimensions meeting European standards, for the shape-mating reception of the plastic inner container 2.

The bottom 11 of the inner container 2 slopes slightly toward the center of the bottom from two oppositely located sidewalls 2a, 2b of the container 2 and furthermore has a slight gradient from the rear wall 2c to the front wall 2d of the container. In this way, the bottom 11 of the inner container 2 constitutes a shallow drainage channel 12 slightly inclined toward the discharge nipple 13 in the front wall 2d for connecting the drainage valve 5, preferably a ball valve or flap valve.

The bottom pan 10 of the pallet 9, deep-drawn of sheet-metal material and adapted in its inclination to the drainage floor 11 of the inner container 2 and having a shallow central channel 14 corresponding to the drainage channel 12 of the inner container 2, exhibits a downwardly drawn outer supporting rim 15 and reinforcing creases 16a, 16b extending in the direction of and transversely to the central channel 14. The bases 17 of these creases lie in a joint plane 18—18. On account of the reinforcing creases 16a, 16b and the central channel 14, downwardly open chambers 19 are formed in the floor pan 10, and the outer supporting rim 15 forms a continuously extending, hollow supporting collar 20 at the floor pan 10.

A continuous outer marginal strip 21 is angled away from the outer supporting rim 15 of the floor pan 10; this strip forms a bottom frame 23 with a reinforcing strut 22 centrally attached underneath the floor pan 10.

In the efflux zone 24 of the deep-drawn floor pan 10 beneath the drainage valve 5 of the inner container 2, a central foot 25 with a U-shaped cross-sectional profile is formed which is open toward the front and in the upward direction.

The lattice jacket 6, fixed in place by the continuously extending supporting collar 20 of the floor pan 10, rests with the lower, horizontally extending lattice bar 8 or with a lower end profile on the marginal strip 21 of the bottom frame 23 of the floor pan 10, and the lattice jacket 6 is fixedly threaded to the pallet frame 28 designed as a steel tube frame by way of the lower horizontal lattice bar 8 together with the floor pan 10 as well as the central feet 25, 26 and corner feet 27.

In a modification of the afore-described embodiment, the lattice jacket and the floor pan can be fixedly threaded to the corner and central feet which latter are welded to the pallet frame.

The lattice jacket 6 is rigidified by an upper frame 29 threadedly connected with the lattice jacket; this frame protects the plastic inner container 2 from above.

The modular construction of the pallet container permits a simple and rapid assembly of the container, a simple exchange of the individual structural parts, and a compact and economical storage as well as a correspondingly economical shipping of the structural parts.

What is claimed is:

1. Pallet container for liquids, with an inner container of a synthetic resin with sealable filling and discharge openings and with an outer jacket of metal in contact with the inner container as well as with a bottom fashioned as a pallet, the pallet (9) shape-matingly receiving the inner container (2) and being attachable to a jacket (6), the bottom (11) of the inner container (2) comprising a drainage floor with a central shallow drainage channel (12) extending with a slight slope from a container rear wall (2c) toward a discharge nipple (13) located on the front wall (2d) of the container (2) for the connection of a drainage valve (5), a floor pan (10) below the drainage bottom (11) of the inner container (2) having reinforcing creases (16a, 16b), the bases (17) of which lie in a common horizontal plane (18—18), said bases forming downwardly open chambers (19) in the floor pan (10), the floor pan (10) having a downwardly drawn outer supporting rim (15) forming a continuously extending, hollow supporting collar (20); and a marginal strip (21) extending at an angle from the outer supporting rim (15) of the floor pan (10), this strip forming, with a reinforcing strut (22) attached underneath the floor pan (10), a bottom frame (23) by means of which the floor pan (10) is attached, together with the jacket (6), to corner feet (27) and central feet (25, 26) of a pallet frame (28).

2. Pallet container according to claim 1, wherein the floor pan (10) is a deep-drawn part of sheet metal with a central foot (25) having a U-shaped cross-sectional profile, this foot being formed in an efflux zone (24) below the drainage valve (5) of the inner container (2) and being open in the forward and upward directions.

* * * * *